United States Patent [19]

Ryder et al.

[11] Patent Number: 4,782,726
[45] Date of Patent: Nov. 8, 1988

[54] LEAD SCREW DRIVER

[75] Inventors: Francis E. Ryder, Arab; Rowland W. Kanner; Donald W. Hunter, both of Guntersville; Timothy R. White, Hanceville, all of Ala.

[73] Assignee: Ryder Internation Corporation, Arab, Ala.

[21] Appl. No.: 2,729

[22] Filed: Jan. 13, 1987

[51] Int. Cl.⁴ .............................................. B25B 29/00
[52] U.S. Cl. ..................................... 81/57.4; 81/57.24
[58] Field of Search ................. 81/57.11, 57.14, 57.24, 81/57.25, 57.26, 57.41, 57.4, 57.3, 57; 29/240, 240.5; 901/41

[56] References Cited

U.S. PATENT DOCUMENTS

| | | | |
|---|---|---|---|
| 3,333,613 | 8/1967 | Bosse | 81/57.4 |
| 3,694,888 | 10/1972 | Bosse | 81/57.4 |
| 4,295,393 | 10/1981 | Adcock | 81/57.4 |
| 4,483,219 | 11/1984 | Sticht | 81/57.4 |

*Primary Examiner*—Frederick R. Schmidt
*Assistant Examiner*—Bradley I. Vaught
*Attorney, Agent, or Firm*—Trexler, Bushnell, Giangiorgi & Blackstone, Ltd.

[57] ABSTRACT

Our lead screw driver comprises a drive head for engaging and driving a complementary driver head portion of a threaded fastener, and a manipulator for positioning the drive head and a fastener engaged therewith for alignment of the same for driving the fastener into a pilot hole at a given location in a workpiece. A motor rotates the drive head and a lead screw arrangement is operatively coupled with the drive head for advancing the same at a given rate corresponding to the thread pitch of the fastener to be driven thereby so as to minimize stresses upon the material of the workpiece during the driving of the fastener. Preferably, a brake is operatively coupled to the manipulator and this brake is selectively actuatable for holding the manipulator against movement of the manipulator means, to hold the fastener aligned with the pilot hole while driving the fastener.

27 Claims, 4 Drawing Sheets

LEAD SCREW DRIVER

BACKGROUND OF THE INVENTION

This invention is directed generally to the power drive tool arts, and more particularly to a novel lead screw driver tool for installing a threaded fastener in a pilot hole provided therefor in a workpiece.

A number of problems have arisen with respect to the driving of threaded fasteners into pilot holes provided therefor in workpieces, particularly in automotive and other high-volume assembly line types of operations. In such operations, it is important to provide both pre-molded or partially preassembled parts, and tools which permit the operator to install or assemble parts as quickly and as accurately as possible.

In such applications, untapped pilot holes are generally utilized with tapping or so-called "self-tapping" screws being utilized to engage the untapped hole, thus both tapping and fastening in a single operation. It is important that the self-tapping screw be accurately aligned with the pilot hole prior to the driving thereof, to assure the desired coupling therebetween and to minimize any possible damage or stripping of the pilot hole, which might lead to unreliable engagement. Since the material of the workpiece and pilot hole is often somewhat softer than the material of the screw threads, such alignment is important to avoid such damage to the workpiece and possible unreliability of the resulting assembly.

Similarly, it is important to provide both the proper amount of torque and proper amount of axial advancement or advancing force to the fastener, so that the force of driving can be used both to accurately tap the pilot hole and advance the screw. Importantly, many materials are sufficiently soft and/or brittle, such as the hard, low-tensile strength plastics used in many automobile applications, that an improper axial speed or driving force on the screw will in fact drill out and enlarge the pilot hole rather than form a thread in the annular wall of said pilot hole or aperture.

Advantageously, we have designed a driver tool which avoids the foregoing problems of the prior art. Our novel and improved tool provides means for both assuring proper alignment of the screw and tool with the pilot hole during application of the screw, and also assures the proper speed and force of advancement of the screw relative to the pilot hole, to achieve a reliable threading and engagement thereof, regardless of the nature of the material into which the screw is being engaged.

Our lead screw driver system comprises a drive head for engaging and driving a complementary driver head portion of a threaded fastener, and a manipulator for selectively positioning the drive head and a fastener engaged therewith for alignment of the same for driving the fastener into a pilot hole at a given location in a workpiece. A motor rotates the drive head and a lead screw arrangement is operatively coupled with the drive head for advancing the same at a given rate corresponding to the thread pitch of the fastener to be driven thereby so as to eliminate or minimize the axial stresses upon the material of the workpiece during the driving of the fastener. Preferably, a brake is operatively coupled to the manipulator and this brake is selectively actuatable for holding the manipulator against movement and selectively releasable for permitting movement of the manipulator means, to hold the fastener aligned with the pilot hole while driving the fastener.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
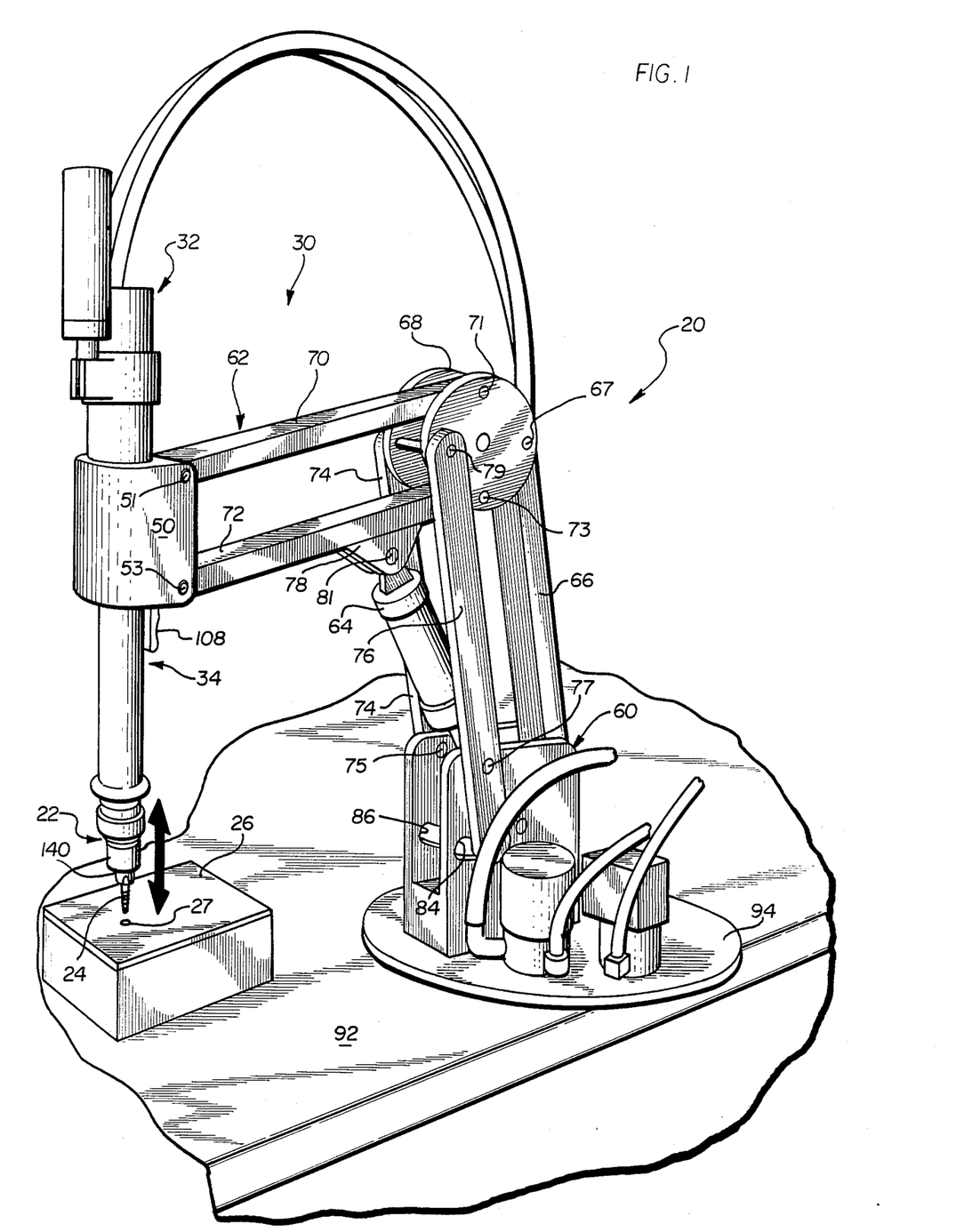
FIG. 1 is a perspective view of a lead screw driver system in accordance with the invention.
Figure 2:
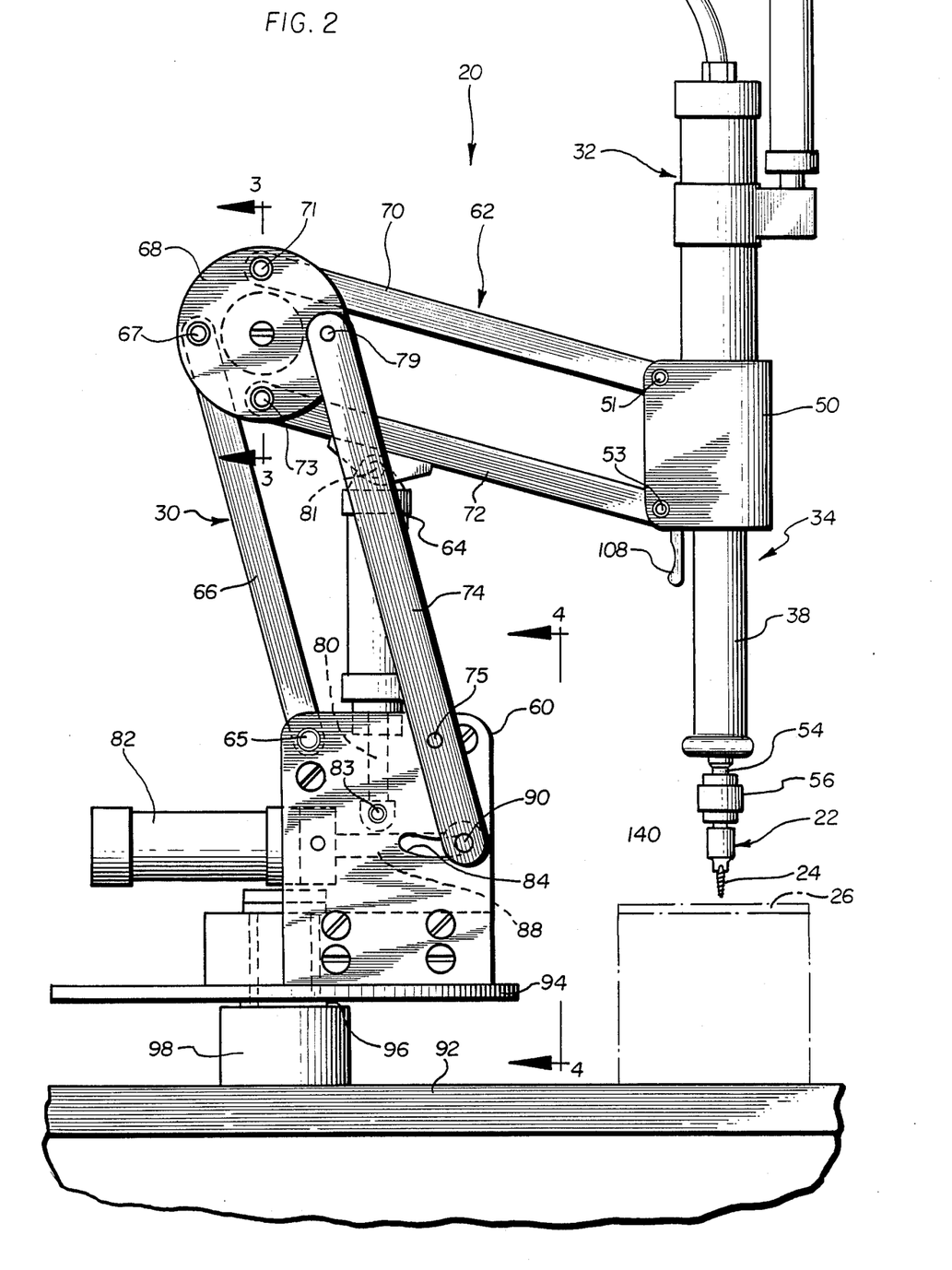
FIG. 2 is a side elevation thereof.

Referring now to the drawings, and initially to FIGS. 1 and 2, a lead screw driver system in accordance with the invention is designated generally by the reference numeral 20. The lead screw driver system 20 includes a drive head means or portion 22 for driving a complementary driver head portion (not shown) of a threaded fastener or screw 24 relative to a given workpiece or surface 26. As will be seen later, the driver head of fastener 24 may be a conventional slotted type of head, a Phillips type head, or a TORX type of head, or indeed any other type of driver head configuration without departing from the invention. Further, the fastener 24 is provided with a self-tapping thread which may be of any one of a number of known types of threads that will cut or otherwise form a female thread in an aperture or pilot hole 27 formed in workpiece 26.

A releasably locking manipulator means or assembly which here takes the form of a pantograph frame-type of assembly is designated generally by reference numeral 30. The pantograph 30 is arranged for selectively positioning the drive head 22 and fastener 24 in alignment for driving the fastener into a selected or desired location in the workpiece 26. In accordance with the invention, this manipulator means or assembly 30 is also arranged, as will be more fully described hereinbelow, for releasably locking in place in this preselected or desired position for so aligning the drive head and fastener A drive motor or motor means 32, in the form of an air motor, is provided for rotating the drive head and a coupling or mounting means or assembly designated generally by the reference numeral 34 operatively couples this motor 32 with the drive head 22.

Figures 3, 4, 5:
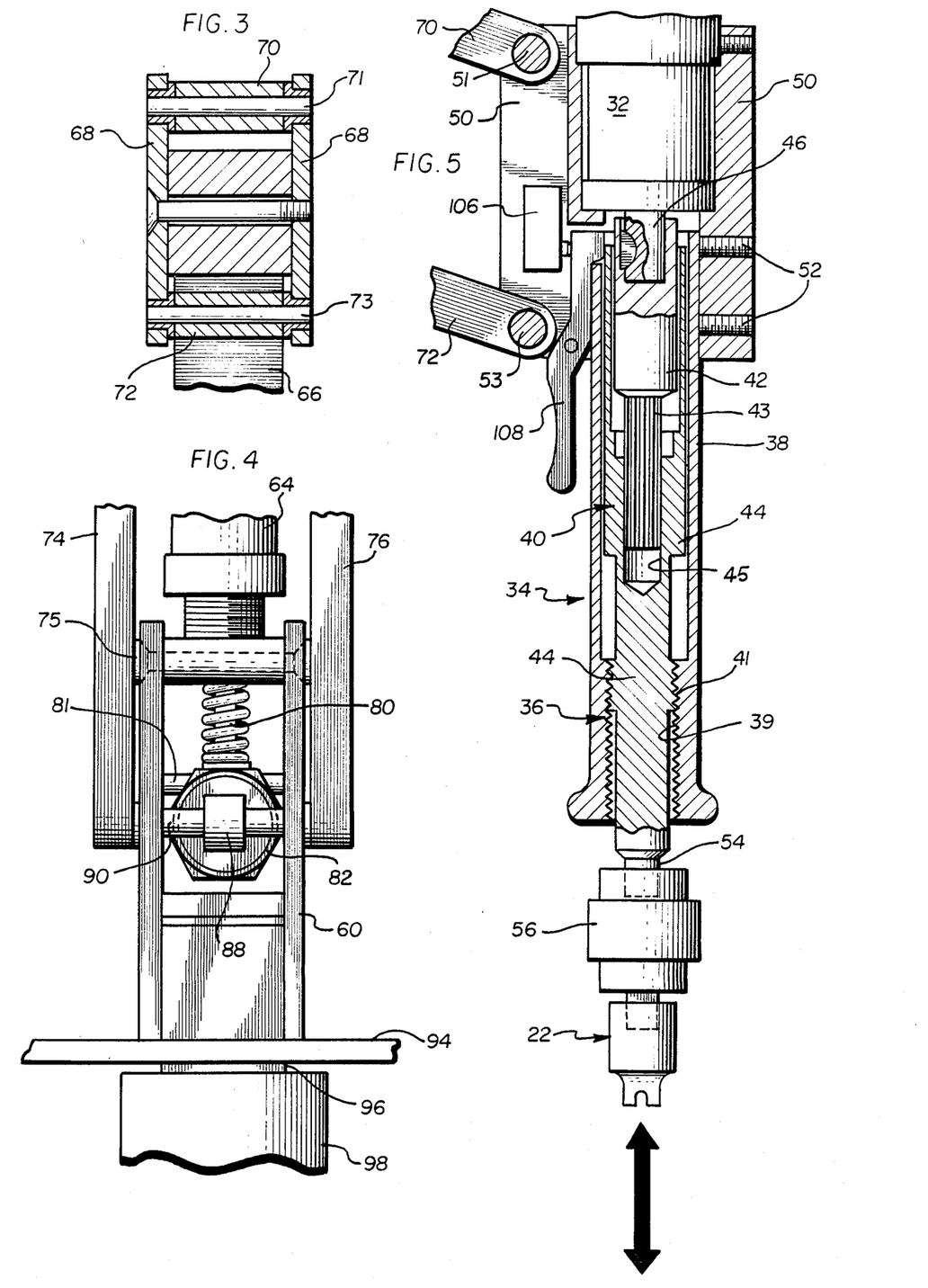
FIG. 3 is a partial sectional view taken generally along the line 3—3 of FIG. 2.
FIG. 4 is a partial elevational view taken generally along the line 4—4 of FIG. 2.
FIG. 5 is a plan elevation, partially in section and partially broken away, illustrating further details of the lead screw driver of the invention.

In accordance with an important feature of the invention, novel lead screw means or a lead screw arrangement 36, best viewed in FIG. 5, is operatively coupled with the drive head means for advancing the same at a given predetermined rate, which is selected to correspond to the thread pitch of the fastener 24. This arrangement advantageously minimizes stresses upon the material of the workpiece 26 during the driving of the fastener More specifically, as mentioned above, many applications achieve fastening utilizing self-tapping screws to engage pilot holes in surfaces or workpieces constructed of relatively soft and/or brittle materials as for example hard, low-tensile strength plastics used in numerous automotive applications. As such, excessive axial speed or force of driving of the screw may tend to drill out and enlarge the pilot hole rather than thread and engage the screw therewith as desired. Accordingly, our novel lead screw arrangement 36, which will be described in more detail hereinbelow, advantageously substantially matches the axial advancement of the screw 24 with its thread pitch, to substantially avoid the transmission of undue axial stresses to the workpiece material and consequent possibility of such damage which could result in improper or insecure threading and fastening. Thus, since thread pitch of screw 24 and the thread which controls advancement of the lead screw arrangement 36 are matching, during driving of the fastener 24, the lead screw arrangement 36 takes or accommodates all of the axial pressure. The fastener 24 only cuts or forms a mating female thread in the aperture 27 in workpiece 26. Most importantly, the female threads thus formed in the brittle material of the workpiece 26 are not stressed and carry no load until full engagement is attained. At this time there will exist a sufficient depth of engagement and engaged thread turns so that the tensile load is distributed over all of the female threads, whereby the brittle material of the workpiece can withstand the loading without failure.

Referring now also to FIGS. 3, 4 and 5, the mounting means 34 will be seen to comprise a stationary portion, in the form of a generally cylindrical guide, sleeve or housing 38, and a drive shaft portion 40 which is rotatable within the sleeve or guide portion 38. In the illustrated embodiment, the lead screw means 36 comprises complementary, threadably engaged internal and external threads 39 and 41 formed respectively on the distal ends of the stationary guide portion 38 and drive shaft portion 40. More particularly the drive shaft portion 40 of the mounting means includes an upper member 42 and a lower member 44 which are interconnected by mated male and female splines. As such, the respective members will rotate together, with the lower member 44, having the male thread 41 thereon, being free to move axially relative to the upper member 42. The male splined member 42 is fixedly coupled to an output shaft 46 of the motor means or motor 32 to be rotated thereby. The other, or female, splined member 44 is provided with the external threads 41. Accordingly, the female splined member 44 of the drive shaft 40 is both rotatably and axially movable relative to the sleeve or guide portion 38 as it rotates and advances or retracts threadably relative to the engaged threads 39, 41. Importantly, it is these threads 39, 41 which are matched to the pitch of the fastener 24 to be driven.

Thus, when motor 32 is energized, upper member 42 will rotate and through the splined connections 43, 45 impart rotation to lower member 44. The threaded engagement between member 44 and sleeve 38 at threads 39, 41 will cause the lower portion 44 to translate axially of the sleeve as well as rotate. The lower portion 44 is coupled to the fastener drive portion 22 by means of a slip clutch 56, as will be discussed.

Thus, since the threads 39, 41 have a pitch corresponding to that of a fastener 24 to be driven, the rate of advancement of the fastener by the apparatus 20 is matched to the advancement of the fastener in the workpiece determined by the threads on the fastener 24. As such, the fastener 24 only cuts or forms the female thread in the workpiece, with the lead screw arrangement 36 accommodating the axial load. Therefore, the female threads formed by the fastener 24 need not carry or be subjected to tensile load until the fastener is fully seated. As noted above, when this occurs, the full compliment of thread turns are thus available to accommodate said loading.

Moreover, it will be seen that the subassembly comprising the sleeve 38 and female splined member 44, are removable relative to the motor 32 and male splined member 42 so as to be relatively simply and quickly replaced by like members having different thread pitches for the mating lead screw threads 39, 41 for driving a fastener 24 having a different thread pitch corresponding to that of threads 39 and 41. In this regard, a housing 50 mounts both the motor 32 and an axially upper end of guide sleeve 38. Preferably, set screws 52 are utilized to releasably mount the guide sleeve 38 and female splined member 44 which is threadably engaged therewith at lead screw threads 39, 41.

In accordance with a preferred feature of the invention, the female splined member 44 is provided at its axially outermost or lowermost end with a suitable coupling means or portion 54, for mounting to a one-way clutch 56 intermediate the member 44 driven by motor means 32 and drive head means 22. Advantageously, this one-way clutch 56, which in the illustrated embodiment is disposed between the drive shaft 40 and drive head 22, permits easy release of the fastener head as the motor 32 is reversed following completion of the driving of the fastener 24 relative to the workpiece 26. Hence, the screw or fastener 24 remains in place during the backing-up or "resetting" of the lead screw driver system 20. In this regard, it will be appreciated that motor 32 is capable of bidirectional rotation to achieve both driving or advancement of thread 39 relative to thread 41 and withdrawal thereof to achieve a resetting of the tool to the position shown in FIG. 5 for driving further similar fasteners.

We have also recognized that the above-described system best operates from a rigid support member or system. However, this rigid support must be capable of movement or manipulation, as previously indicated, to achieve the desired initial alignment of the fastener 24 and drive head 22 with the location on workpiece 26 (such as a pilot hole 27) at which the fastener 24 is to be driven. Accordingly, our lead screw river system advantageously employs a manipulator means, as mentioned above, comprising a pantograph-type system 30. In the illustrated embodiment, this pantograph-type system 30 includes a frame member or portion 60 and at least one arm 62 mounted to the frame, and operatively engaged therewith by means of a hydraulic cylinder means or assembly 64 coupled between the frame and arm.

More particularly, in the preferred embodiment illustrated the pantograph assembly 30 comprises an elongate arm 66 which is pivotally mounted at one end thereof as indicated at 65 to the frame 60. Arm 66 extends generally vertically upwardly from pivot 75 and has an opposite end pivotally mounted at 67 to a generally cylindrical spindle member 68. This latter spindle member 68 also pivotally mounts one free end of each of a pair of elongate arm members 70, 72 comprising arm means 62, at generally diametrically opposed pivot means 71, 73 thereupon. Opposite ends of arms 70 and 72 are pivotally mounted at 51, 53 to the previously mentioned frame member 50. A final pair of substantially identical and oppositely facing control arms 74, 76 are pivotally mounted at points spaced somewhat from one end thereof, as indicated at 75, 77 to the frame 60 and pivotally mounted at the opposite end thereof as indicated at 79 to the spindle member 68, preferably at a point diametrically opposed to the pivotal mounting at 67 of arm 66 thereto.

Moreover, these latter two points 67 and 79 of mounting are preferably located on a diameter spaced by 90 degrees; that is, perpendicular with respect to the diameter defined by the mounting points 71, 73 of arms 70, 72. Also, the point of coupling of cylinder 64 with arm 72 is preferably at some portion thereof spaced inwardly of pivot 73; that is, intermediate its opposite pivotally coupled ends. More particularly, cylinder 64 is pivotally coupled at 81 to a mounting bracket portion 78 provided on arm 72, and a piston member or portion 82 thereof is pivotally mounted at 83 to frame 60. This arrangement permits a desired controlled lifting and lowering of the arms 70 and 72, and corresponding axial or vertically upward and downward motion of frame 50 and the drive components mounted thereto.

In the illustrated embodiment, a further piston-and-cylinder member or assembly 82 is also mounted to the frame 60 for bidirectionally driving or moving a lower end of arms 74 and 76. In this regard, the ends of arms 74 and 76 closest to pivots 75, 77 are further pivotally and slidably engaged with a pair of arcuate, elongate slots or tracks 84, 86 provided in the frame 60. Preferably, the piston-and-cylinder 82 has its piston portion 88 pivotally coupled at its outermost end with a transverse shaft 90 joining the respective arms 74, 76 and riding in the slots or tracks 84, 86 to so mount the arms 74, 76.

Additionally, to permit optimal manipulation of the lead screw driver system, the frame 60 is mounted for rotation relative to a fixed or rigid surface 92. In the illustrated embodiment, the rotatable mounting of frame 60 is accomplished by means of a turntable or platform 94 which has a central shaft 96 rotatably mounted relative to an enlarged bearing 98 provided therefor on mounting surface or platform 92.

While the specific pantograph construction described above has been utilized in the preferred form illustrated, it will be understood that other manipulator systems may indeed be utilized for mounting our lead screw driver system without departing from the invention.

In accordance with a further feature of the invention, the system advantageously includes brake means operatively coupled with the manipulator means or pantograph assembly 30. The brake means are selectively actuable for alternatively permitting and preventing movement thereof for initially achieving and thereafter maintaining alignment of the drive head 22 with the selected or desired location on surface or workpiece 26 That is, the brake means or brake system is arranged for selective actuation so as to maintain the manipulating means or pantograph assembly 30 substantially locked in position during the driving of the fastener 24. In the illustrated embodiment, this brake means includes the cylinders 64 and 82 coupled to the various portions of the pantograph assembly, as described above, and related components shown in FIG. 10.

Figure 10:
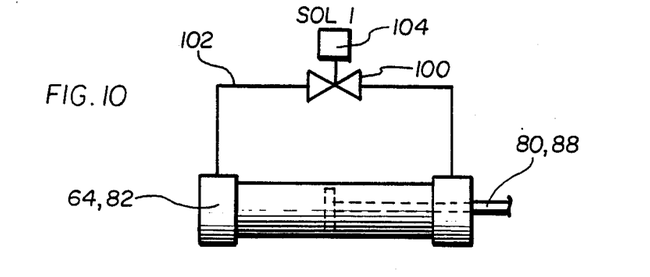
FIG. 10 is a schematic showing of a hydraulic circuit useful with the system of the invention.

Referring also to FIG. 10, each of the cylinders is coupled with a hydraulic valve, schematically indicated at reference numeral 100. This hydraulic valve 100 is interposed in a hydraulic line 102 which interconnects respective ends of each of cylinders 64, 82 to either side of the mounting of the piston 80, 88 therein. Accordingly, when the valve 100 is in the open circuit condition, hydraulic fluid is permitted to flow, thereby permitting movement of the piston 80, 88 relative to its associated cylinder. On the other hand, when the valve 100 is in a closed condition, the flow of fluid through connecting line 102 is precluded, thereby effectively braking or preventing movement of the piston relative to the cylinder. Upon reference to FIGS. 1 and 2, it will be seen that the braking or locking of the cylinders also effectively prevents further movement of the arms 62, 66; 74, 76 of the pantograph assembly.

Operation of valve 100 is in turn controlled by a control member schematically indicated at 104. In the illustrated embodiment, this control member 104 is a solenoid (SOL 1) responsive to operation of a manually activatable switch 106 (see FIG. 5) which is selectively actuated by a lever-like trigger 108 pivotally mounted to the frame or housing 50. In the preferred embodiment illustrated, the lever or trigger 108 is preferably grasped and depressed by the operator only during driving of a fastener, and not during manipulation and positioning of the housing 50 and associated drive system assembly and components. Hence, the control circuit is arranged such that the non-actuated condition of switch 106 during this time causes the control member or solenoid 104 to hold the valve 100 in the open condition. However, upon depressing trigger 108, the switch 106 activates the control member 104 to move valve 100 to the closed position, thereby locking or braking the pantograph system to maintain the position of the drive components.

This same trigger 108 and switch 106 also serve as a forward/reverse control for the motor means 32. In this regard, motor means 32 preferably includes a pneumatic or air-driven motor. Accordingly, a pneumatic or air-controlled system as illustrated in FIG. 9 is utilized to control the flow of pressurized air to motor 32 to achieve forward or reverse rotation thereof, or to hold the motor stationary.

Figure 8:
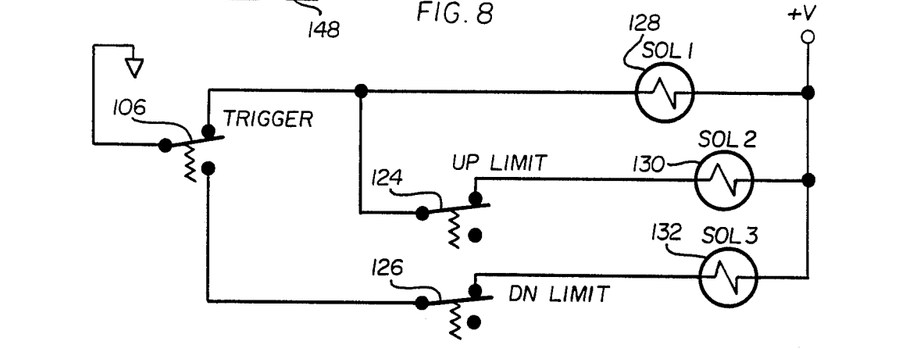
FIG. 8 is a schematic showing of an electrical circuit useful with the invention.
Figure 9:
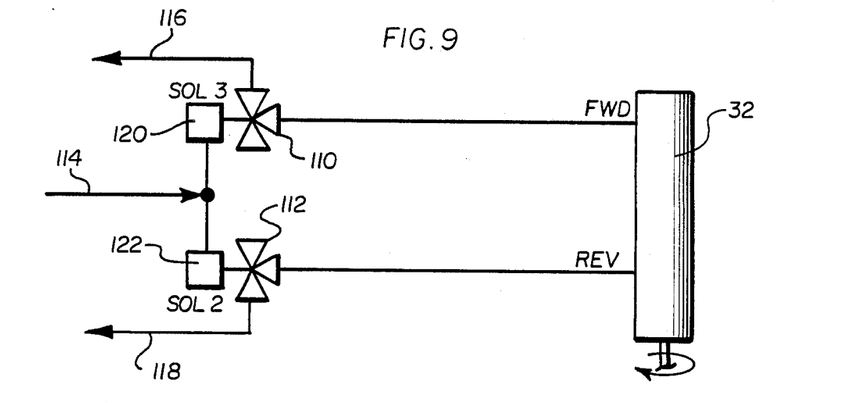
FIG. 9 is a schematic showing of an air or pneumatic circuit useful with the invention.

The pneumatic system shown in FIG. 9 includes first and second controllable pneumatic or air valve members 110, 112. Each of these valves is a three-way valve member having an air inlet port connected to receive pressurized air from an air inlet line 114. In the illustrated embodiment, pressurized air at substantially 90 psi is utilized. A second or middle port of each valve is connected to one of the "forward" and "reverse" inlets of the air motor 32, while a third, or exhaust port thereof is coupled with an associated exhaust line or outlet 116, 118. The respective valves 110 and 112 are controlled by respective associated control members 120, 122 (preferably solenoids SOL 2 and SOL 3), which in turn respond to limit switches (see FIG. 8) mounted at suitable locations relative to the mounting and drive system 34 (locations not shown), for detecting respective extremes or limits of the axial motion of the axially movable member 44 relative to the fixed sleeve or guide member 38. These positions correspond respectively to the fully advanced or driven position of a fastener being driven by the system and a totally withdrawn or reset position of the lead screw driver assembly, respectively.

Referring now also to FIG. 8, the trigger switch 106 associated with trigger 108 is shown together with respective up-limit and down-limit switches or sensors 124, 126. These respective switches are shown in electrical circuit with respective solenoid actuator coils 128, 130 and 132 which are in turn coupled to a suitable positive voltage source (+V) at one side thereof and are connectable through respective switches 124, 126 and 106 to ground to complete a circuit therethrough. These respective solenoid coils are also designated SOL 1, SOL 2 and SOL 3 to correspond to the associated ones of the control members or solenoids 104, 120 and 122 for the respective hydraulic and pneumatic circuits of FIGS. 9 and 10 which are arranged to be activated in suitable fashion in response to energization of the like-designated ones of these solenoid coils. It will be noted that each of control switches 106, 124 and 126 is here designated as a normally closed switch. It should be recognized, however, that other specific circuit and control arrangements may be utilized to achieve generally the same operation of the system without departing from the invention.

As indicated above, the specific control circuit utilized is such as to hold the pantograph in a generally locked condition when the trigger 108 is depressed, which depression also energizes the motor in the forward rotation direction for driving or advancing the drive head 22 for advancing a fastener 24 coupled therewith. Such forward rotation continues until the downward limit of motion is reached, tripping or activating the down-limit switch 126, which results in solenoid 3 energizing the motor for rotation in the reverse direction, until reaching the position of the up-limit switch 124. Thereupon the system is reset, and the trigger may be released, thereby releasing a braking or locking of the pantograph by the action of the cylinders 64, 82 as described above, and readying the system to receive a further fastener to be driven thereby.

Hence, the electrical circuit of FIG. 8 comprises a control means operatively coupled with the trigger and with the motor for energizing the motor for forward rotation to drive a fastener relative to the workpiece when the trigger is actuated for engaging the braking means. On the other hand, the system is such that it reverses rotation of the motor when the trigger is released, and further halts rotation of the motor when either the up or down limits of motion of the drive assembly are reached, indicating either the fully driven position of the fastener, or the fully retracted position of the driver for receiving a new fastener to be driven.

Figure 6:
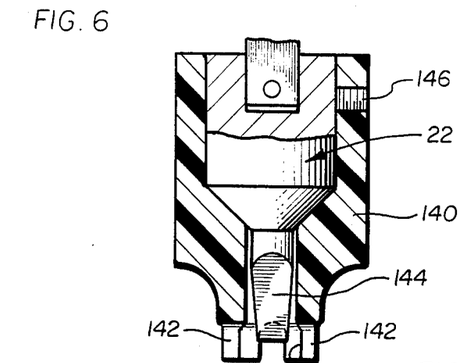
FIG. 6 is an enlarged elevation, partially in section and partially broken away, of a bit portion of the tool of the invention.
Figure 7:
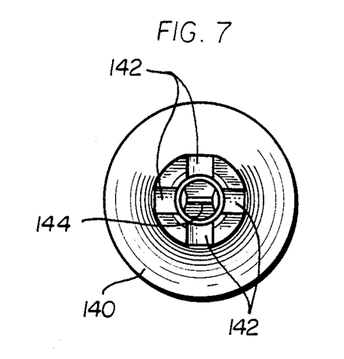
FIG. 7 is an end plan view of the bit of FIG. 6.

Reference is next invited to FIGS. 6 and 7 wherein a novel bit or fastener-holding member 140, in accordance with a preferred form of the invention, is illustrated. This bit or holding member surroundingly engages the driver head portion 22 of the tool described above. The bit 140 comprises a plurality of circumferentially spaced gripping fingers which are of a resilient nature for peripherally engaging and gripping a driver head portion of the fastener 24. These fingers 142, in the illustrated embodiment, are four in number, and define two pairs of diametrically opposed fingers which are located on perpendicularly disposed diameters relative to the center of driver head 22. In this regard, at least a drive head portion 144 of drive head means 22 is substantially axially centered with respect to the fingers and extends somewhat into the space between the fingers of the fastener holding member for engaging the driver head portion of the fastener grippingly engaged therein. In the illustrated embodiment, a conventional slotted screw driver type head 144 has been illustrated, however it will be understood that any other desired form of drive head for engaging a complementary formed driver head portion of a fastener may be employed without departing from the invention. Preferably the fingers 142 are integrally formed with body 140 which is joined with the drive head means 22 by suitable means such as a set screw 146. These resiliently formed fingers 142 generally define an inner diameter 148 slightly smaller that the outer diameter of the fastener head to be gripped thereby to assure a slight amount of resilient outward deformation for gripping engagement thereof.

The sequence of operation of the above-described lead screw driver of the invention in driving a fastener 24 relative to a workpiece 26 is generally as follows:

Initially a lead screw arrangement 36 is selected having engaged threaded portions 39 and 41 wherein the thread pitch of said portions corresponds essentially to that of the thread on the fastener 24 to be driven. With the lead screw driver 20 in the fully up or ready position as illustrated in FIGS. 1 and 2, the fastener 24 is inserted in the holder 140 and the pantograph assembly is moved to the desired location to align the fastener 24 with the pilot hole 27 in the workpiece 26. During this time the limit switches and trigger switch are in the normally closed conditions indicated in FIG. 8. Thereupon, the operator depresses trigger 108 to drive the fastener 24, whereupon the limit switch 106 of FIG. 8 assumes a position opposite to that shown in FIG. 8, contacting the lower contactor therein. In this condition the solenoid 132 (SOL 3) will energize the motor to rotate in a clockwise direction for forward driving of the screw until the down-limit switch 126 is reached and depressed, de-energizing solenoid 132. During this time trigger 106 is held depressed and solenoid 128 is de-energized, holding the valves 100 in their open condition, locking the cylinders 64, 82 and hence locking the pantograph in position. The downward motion of the driver will continue until either the down-limit switch 126 is contacted and actuated, or until the trigger is released. Either of these events will halt the forward or clockwise rotation of the motor. During downward driving of the lower portion 44 of drive shaft 40, the rate of axial advancement of the drive head 22 is matched to the pitch of the threads on fastener 24. Accordingly, as discussed above, a female thread will be formed in the workpiece aperture 27 and the resulting female thread turns will not be subjected to substantial tensile loading until the fastener 24 is fully seated.

When the operator releases the trigger, the trigger switch 106 again assumes the position shown in FIG. 8, which energizes solenoid 128, again releasing the respective cylinders 64 and 82 from their locked or braked condition. In this condition solenoid 130 is activated, causing the motor 32 to rotate in its counterclockwise or reverse direction moving the member 44 upwardly until the up-limit switch 124 is reached and activated. During upward movement of member 44, it will rotate in a counter-clockwise direction. However, since the slip clutch is a one-way clutch, the drive head 22 will be retracted without counter-clockwise rotation which, if effected, would unseat the fastener 24. Upon the up-limit switch being engaged the system is reset.

While particular embodiments of the invention have been shown and described in detail, it will be obvious to those skilled in the art that changes and modifications of the present invention, in its various aspects, may be made without departing from the invention in its broadest scope, some of which changes and modifications being matters of routine engineering or design, and others being apparent only after study. As such, the scope of the invention should not be limited by the particular embodiment and specific construction described and illustrated herein but should be defined by the appended claims and equivalents thereof. Accordingly, the aim in the appended claims is to cover all such changes and modifications as fall within the true spirit and scope of the invention.

The invention is claimed as follows:

1. A lead screw driver system comprising:
   drive head means for engaging and driving a complementary driver head portion of a threaded fastener;
   releasably locking manipulator means for selectively positioning said drive head means and a fastener engaged therewith for alignment of the same for driving said fastener into a given location in a workpiece, and for releasably locking in place in the selected position;
   motor means for rotating said drive head;
   mounting means for operatively coupling said motor means to said drive head means;
   and lead screw means operatively coupled with said drive head means for advancing the drive head means at a given rate corresponding to the thread pitch of a fastener to be driven thereby so as to minimize stresses upon the material of the workpiece during the driving of said fastener.

2. A system according to claim 1 wherein said mounting means comprises a stationary guide portion and a drive shaft portion; and wherein said lead screw means comprises complementary, threadably engaged internal and external threads, each of said threads being formed on one of said stationary guide portion and said drive shaft portion.

3. A system according to claim 1, wherein said manipulator means comprises a pantograph having a frame and at least one arm, and brake means including hydraulic cylinder means coupled between said frame and each said arm.

4. A system according to claim 2 wherein said mounting means comprises mated male and female splined members; and wherein said motor means is coupled to rotate one of said splined members, the other of said splined members defining the drive shaft member and being provided with one of said internal and external threads comprising said lead screw means.

5. A system according to claim 1 wherein said mounting means includes a one-way clutch operatively coupled intermediate said motor means and said drive head means.

6. A system according to claim 1 wherein said drive head means further includes a fastener holding member comprising a body portion and a plurality of circumferentially spaced gripping fingers for peripherally engaging a driver head portion of said fastener; said drive head means being substantially axially centered with respect to said fingers and extending into said fastener holding member for engaging a driver head portion of said fastener.

7. A system according to claim 6 wherein said fingers are integrally formed with said body and are resiliently deformable for expanding somewhat to accept the screw head therewithin and for thereafter resiliently gripping the same.

8. A system according to claim 1 wherein said manipulator means includes braking means operatively coupled therewith and selectively releasable for alternatively permitting and preventing movement of said manipulator means for alignment with said given location, and for maintaining said manipulator means in said alignment with said given location, once achieved.

9. A system according to claim 8 and further including trigger means operatively coupled with said braking means for manually releasing and activating said braking means; said trigger means being mounted adjacent said drive head means mounting means for selective activation.

10. A system according to claim 1 and further including limit switch means for detecting respectively fully retracted and fully advanced positions of said drive head means relative to said workpiece; and control means responsive to said limit switch means for stopping rotation of said motor means upon detection of either of said fully advanced or fully retracted positions.

11. A system according to claim 1 wherein said said lead screw means are releasably coupled with said manipulator means for selective removal and replacement thereof by a lead screw means corresponding to a different thread pitch.

12. A system according to claim 3 wherein each said hydraulic cylinder means comprises a cylinder member and a piston member axially movable therein, said cylinder member having one port therein to either side of said piston; and wherein said brake means further comprises a valve member coupled intermediate said ports and selectively operable to an open valve position and a closed valve position to achieve, respectively, a movable state and a locked state of said piston relative to said cylinder.

13. A system according to claim 9 and further including control means operatively coupled with said trigger and with said motor means for energizing said motor means for forward rotation to drive a fastener relative to said workpiece when said trigger is actuated for engaging said braking means, and for reversing the rotation of the motor means when said trigger is released.

14. A lead screw driver system comprising: drive head means for engaging and driving a complementary driver head portion of a threaded fastener; manipulator means for selectively positioning said drive head means and a fastener engaged therewith for alignment of the same for driving said fastener into a given location in a workpiece; motor means for rotating said drive head; mounting means for operatively coupling said motor means to said drive head means; and brake means operatively coupled to the manipulator means; said brake means being selectively actuatable for holding said manipulator means against movement and selectively releasable for permitting movement of said manipulator means; and further including lead screw means operatively coupled with said drive head means for advancing the same at a given rate corresponding to the thread pitch of the fastener to be driven thereby so as to minimize stresses upon the material of the workpiece during the driving of said fastener.

15. A system according to claim 14 and further including trigger means operatively coupled with said braking means for manually releasing and activating said braking means, said trigger means being mounted adjacent said drive head means mounting means for selective activation.

16. A system according to claim 14 and further including limit switch means for detecting respectively fully retracted and fully advanced positions of said drive head means relative to said workpiece.

17. A system according to claim 14 wherein said manipulator means comprises a pantograph having a frame and at least one arm, and said brake means comprises hydraulic cylinder means coupled betweem said frame and each said arm.

18. A system according to claim 17 wherein each said hydraulic cylinder means comprises a cylinder member and a piston member axially movable therein, said cylinder member having one port therein to either side of said piston; and wherein said brake means further comprises a valve member coupled intermediate said ports and selectively operable to an open valve position and a closed valve position to achieve, respectively, a movable state and a locked state of said piston relative to said cylinder.

19. A system according to claim 15 and further including control means operatively coupled with said trigger and with said motor means for energizing said motor means for forward rotation to drive a fastener relative to said workpiece when said trigger is actuated for engaging said braking means, and for reversing the rotation of the motor means when said trigger is released.

20. A lead screw driver system comprising: drive head means for engaging and driving a complementary driver head portion of a threaded fastener; manipulator means for selectively positioning said drive head means and a fastener engaged therewith for alignment of the same for driving said fastener into a given location in a workpiece; motor means for rotating said drive head; mounting means for operatively coupling said motor means to said drive head means; and brake means operatively coupled to the manipulator means; said brake means being selectively actuatable for holding said manipulator means against movement and selectively releasable for permitting movement of said manipulator means; wherein said manipulator means comprises a pantograph having a frame and at least one arm, and said brake means comprises hydraulic cylinder means coupled between said frame and each said arm.

21. A system according to claim 14 wherein said mounting means comprises a stationary guide portion and a drive shaft portion; and wherein said lead screw means comprises complementary, threadably engaged internal and external threads, each of said threads being formed in one of said stationary guide portion and said drive shaft portion.

22. A system according to claim 21 wherein said mounting means comprises mated male and female splined members; and wherein said motor means is coupled to rotate one of said splined members, the other of said splined members defining the drive shaft member and being provided with one of said internal and external threads comprising said lead screw means.

23. A lead screw driver system comprising:
drive head means for engaging and driving a complementary driver head portion of a threaded fastener;
motor means for rotating said drive head; mounting means for operatively coupling said motor means to said drive head means;
and lead screw means operatively coupled with said drive head means for advancing the drive head means at a given rate corresponding to the thread pitch of a fastener to be driven thereby so as to minimize stresses upon the material of the workpiece during the driving of said fastener.

24. A system according to claim 23 wherein said mounting means comprises a stationary guide portion and a drive shaft portion; and wherein said lead screw means comprises complementary, threadably engaged internal and external threads, each of said threads being formed on one of said stationary guide portion and said drive shaft portion.

25. A system according to claim 24 wherein said mounting means further comprises mated male and female splined members; and wherein said motor means is coupled to rotate one of said splined members, the other of said splined members defining the drive shaft member and being provided with one of said internal and external threads comprising said lead screw means.

26. A system according to claim 23 wherein said mounting means includes a one-way clutch operatively coupled intermediate said motor means and said drive head means.

27. A system according to claim 23 and further including limit switch means for detecting respectively fully retracted and fully advanced positions of said drive head means relative to said workpiece; and control means responsive to said limit switch means for stopping rotation of said motor means upon detection of either of said fully advanced or fully retracted positions.

* * * * *